United States Patent
Boyle

(10) Patent No.: US 11,173,949 B2
(45) Date of Patent: Nov. 16, 2021

(54) APPARATUS FOR USE IN TURNING STEERABLE VEHICLE WHEELS

(71) Applicant: ZF Active Safety and Electronics US LLC, Livonia, OH (US)

(72) Inventor: Kevin E. Boyle, Hermitage, TN (US)

(73) Assignee: ZF ACTIVE SAFETY AND ELECTRONICS US LLC, Livonia, MI (US)

(*) Notice: Subject to any disclaimer, the term of this patent is extended or adjusted under 35 U.S.C. 154(b) by 216 days.

(21) Appl. No.: 16/448,005

(22) Filed: Jun. 21, 2019

(65) Prior Publication Data
US 2020/0398887 A1    Dec. 24, 2020

(51) Int. Cl.
*B62D 5/04* (2006.01)
*B62D 15/02* (2006.01)

(52) U.S. Cl.
CPC ......... *B62D 5/0448* (2013.01); *B62D 5/0424* (2013.01); *B62D 5/0463* (2013.01); *B62D 15/0205* (2013.01)

(58) Field of Classification Search
CPC .. B62D 5/0448; B62D 5/0445; B62D 5/0424; B62D 5/0463; B62D 15/0205
See application file for complete search history.

(56) References Cited

U.S. PATENT DOCUMENTS

| | | | |
|---|---|---|---|
| 4,841,790 A * | 6/1989 | Williston | B62D 5/0424 180/444 |
| 6,155,376 A * | 12/2000 | Cheng | B62D 5/0421 180/444 |
| 6,629,578 B2 * | 10/2003 | Saruwatari | B62D 5/0421 180/444 |
| 6,823,962 B2 * | 11/2004 | Iwasa | B62D 5/0421 180/444 |
| 6,918,457 B2 * | 7/2005 | Saruwatari | B62D 5/0421 180/444 |
| 7,021,416 B2 * | 4/2006 | Kapaan | B60W 30/18 180/405 |
| 7,052,427 B2 * | 5/2006 | Kapaan | B62D 1/163 188/158 |
| 7,055,646 B2 | 6/2006 | Bugosh | |
| 8,636,099 B2 * | 1/2014 | Kim | B62D 3/02 180/444 |

(Continued)

*Primary Examiner* — Minnah L Seoh
*Assistant Examiner* — Michael R Stabley
(74) *Attorney, Agent, or Firm* — Tarolli, Sundheim, Covell & Tummino LLP

(57) ABSTRACT

An apparatus for use in turning steerable vehicle wheels includes a steering member connected to at least one steerable vehicle wheel. The steering member moves axially to effect turning movement of the at least one steerable vehicle wheel. The steering member has an externally threaded portion. A ball nut assembly is connected with the externally threaded portion of the steering member. The ball nut assembly is rotatable relative to the steering member to axially move the steering member. A first gear member is rotatable in response to rotation of a steering wheel. A second gear member disposed in meshing engagement with the first gear member rotates in response to rotation of the first gear member. The ball nut assembly rotates relative to the steering member in response to rotation of the second gear member.

15 Claims, 2 Drawing Sheets

(56) References Cited

U.S. PATENT DOCUMENTS

| | | | | |
|---|---|---|---|---|
| 9,004,222 B2* | 4/2015 | Kaneko | ............... | B62D 5/0448 |
| | | | | 180/444 |
| 2006/0278466 A1* | 12/2006 | Cheng | ..................... | B62D 5/04 |
| | | | | 180/444 |

* cited by examiner

APPARATUS FOR USE IN TURNING STEERABLE VEHICLE WHEELS

TECHNICAL FIELD

The present invention relates to an apparatus for use in turning steerable vehicle wheels and, more specifically, to an electric power steering gear for use in turning steerable wheels of a vehicle, especially a commercial vehicle such as a heavy truck.

BACKGROUND OF THE INVENTION

A known vehicle steering apparatus includes a steering member which is axially movable to effect turning movement of steerable vehicle wheels. A pinion is disposed in meshing engagement with a rack portion of the steering member. A steering column interconnects the pinion and a vehicle steering wheel. A ball nut assembly is connected with an externally threaded portion of the steering member. A motor is connected with the ball nut assembly. The motor is operable to effect rotation of the ball nut assembly relative to the steering member to cause the steering member to move axially relative to the vehicle. A steering apparatus having this general construction is disclosed in U.S. Pat. No. 7,055,646.

SUMMARY OF THE INVENTION

The present invention is directed to an apparatus for use in turning steerable vehicle wheels including a steering member connected to at least one steerable vehicle wheel. The steering member moves axially to effect turning movement of the at least one steerable vehicle wheel. The steering member has an externally threaded portion. A ball nut assembly is connected with the externally threaded portion of the steering member. The ball nut assembly is rotatable relative to the steering member to axially move the steering member. A first gear member is rotatable in response to rotation of a steering wheel. A second gear member disposed in meshing engagement with the first gear member rotates in response to rotation of the first gear member. The ball nut assembly rotates relative to the steering member in response to rotation of the second gear member.

The apparatus for use in turning steerable vehicle wheels may include an electrical motor connected with the ball nut assembly. The motor is operable to apply a rotational force to the ball nut assembly to urge the ball nut assembly to rotate relative the steering member.

The second gear member may have a first gear in meshing engagement with the first gear member and a second gear in meshing engagement with a third gear member connected with the ball nut assembly. The third gear member may be connected to the ball nut assembly and rotatable with the ball nut assembly relative to the steering member.

BRIEF DESCRIPTION OF THE DRAWINGS

The foregoing and other features of the present invention will become more apparent to those skilled in the art to which the present invention relates upon reading the following description with reference to the accompanying drawings, in which.

DESCRIPTION

Figure 1:
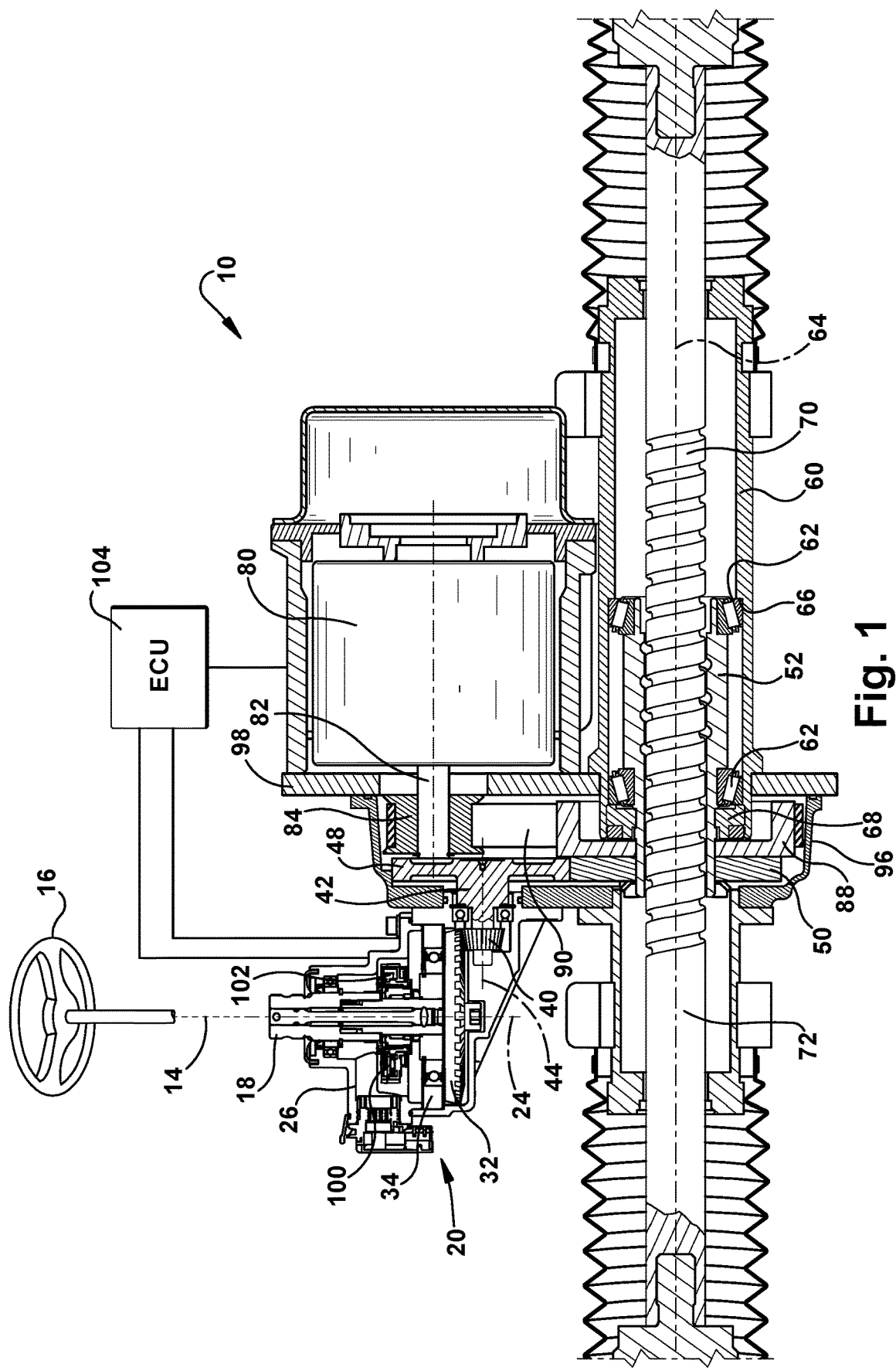
FIG. 1 is schematic illustration of an apparatus for turning steerable vehicle wheels constructed in accordance with a first embodiment of the present invention.
Figure 2:
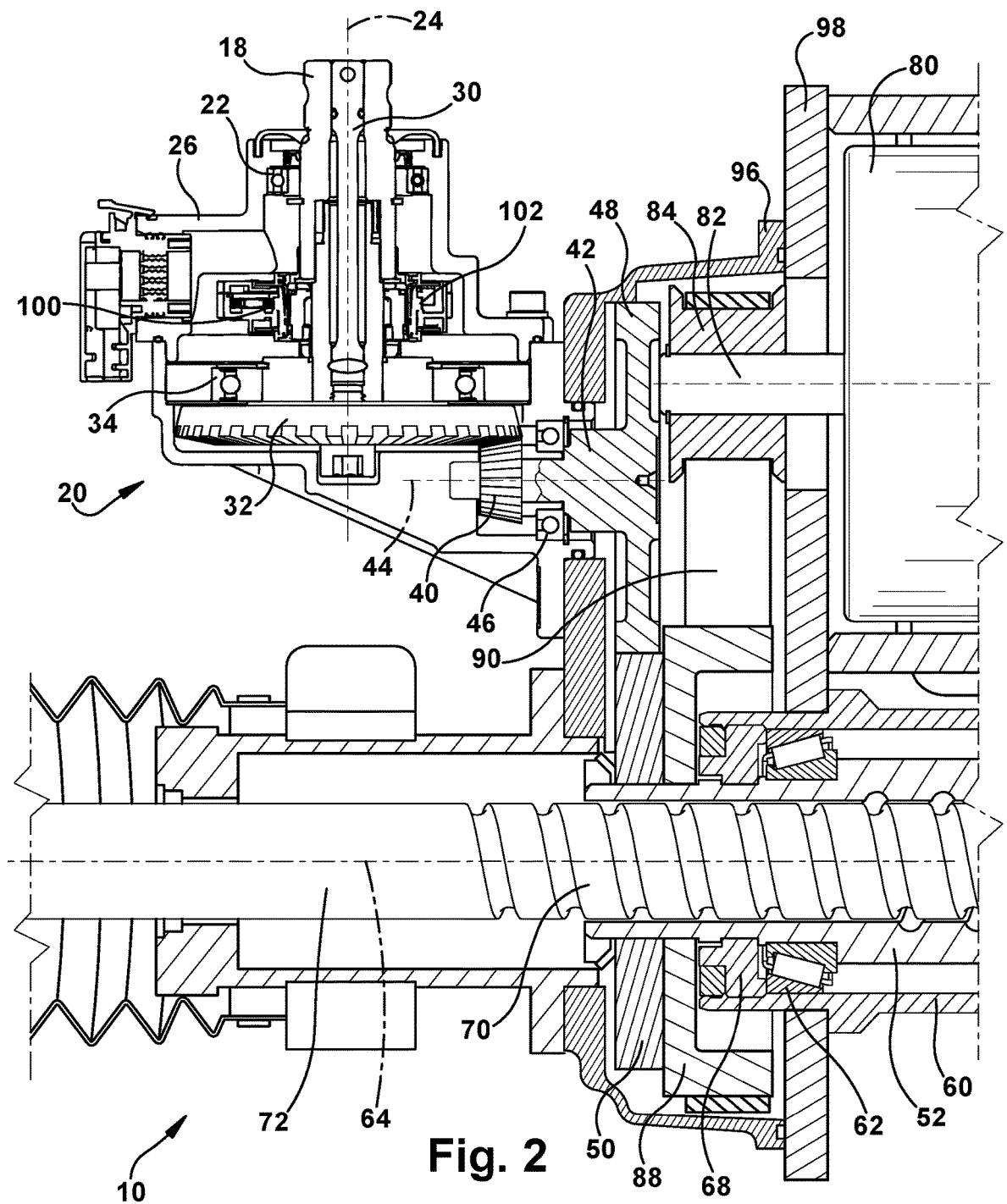
FIG. 2 is an enlarged portion of the apparatus of FIG. 1.

An apparatus 10 for use in turning steerable vehicle wheels constructed in accordance with the present invention is illustrated in FIGS. 1 and 2. The apparatus 10 includes a steering column 14 which is connected to a steering wheel 16. The steering column 14 is also connected to an input member 18 of a gear box 20. The input member 18 (FIG. 2) is supported by bearings 22 for rotation about an axis 24 of the input member relative to a housing 26 of the gear box 20. Upon rotation of the steering wheel 16, force is transmitted through the steering column 14 to the input member 18 to cause rotation of the input member relative to the housing 26.

The input member 18 is connected to a first end of a torsion bar 30. A second end of the torsion bar 30 is connected to a first gear member 32. The first gear member 32 is supported for rotation about the axis 24 relative to the housing 26 by bearings 34. The torsion bar 30 permits relative rotation between the input member 18 and the first gear member 32. Although the apparatus 10 is described as including a torsion bar 30 that permits relative rotation between the input member 18 and the first gear member 32, it is contemplated that the first gear member may be directly connected to the input member 18. The first gear member 32 may be a bevel gear which is rotatable relative to the housing 26 under the influence of force transmitted through the steering column 14 and the input member 18.

The first gear member 32 may mesh with a gear 40 on a first axial end of a second gear member 42. The second gear member 42 is supported for rotation about an axis 44 relative to the housing 26 by bearings 46. The axis 44 extends transverse to the axis 24 and may extend generally perpendicular to the axis 24. The gear 40 on the second gear member 42 may be a bevel gear which is rotatable relative to the housing 26 about the axis 44 under the influence of force transmitted through the steering column 14, the input member 18 and the first gear member 32. The gear members 32, 42 may increase the torque applied to the input member 18 and the steering column 14.

The second gear member 42 has a gear 48 on a second axial end. The gear 48 rotates with the gear 40 and the second gear member 42 about the axis 44 relative to the housing 26. The gear 48 meshes with a third gear member 50 connected with a ball nut assembly 52. The ball nut assembly 52 rotates with the third gear member 50 under the influence of force transmitted through the steering column 14, the input member 18 and the first and second gear members 32, 42. Although the third gear member 50 is described as being connected with the ball nut assembly 52, it is contemplated that the third gear member may be formed on the ball nut assembly 52.

The ball nut assembly 52 extends within a tubular housing 60. The ball nut assembly 52 is supported for rotation relative to the housing 60 by bearings 62. The bearings 62 support the ball nut assembly 52 for rotation about an axis 64 that extends generally parallel to the axis 44 of the second gear member 42. The bearings 62 engage a shoulder 66 on the interior of the housing 60 and an end cap 68 of the housing to prevent axial movement of the ball nut assembly 52 relative to the housing.

The ball nut assembly 52 extends around an externally threaded portion 70 of a steering member 72. The steering member 72 is connected to at least one steerable vehicle wheel in any desired manner. The steering member 72 is axially movable within the housing 60 along the axis 64. The ball nut assembly 52 includes a plurality of balls which are disposed in engagement with the externally threaded portion 70 of the steering member 72. Rotation of the ball nut assembly 52 relative to the housing 60 and the steering member 72 is effective to move the steering member axially relative to the ball nut assembly and axially relative to the housing.

A reversible electric motor 80 is operable to apply a rotational force to the ball nut assembly 52 to urge the ball nut assembly to rotate relative the steering member 72 and the housing 60. The electric motor 80 (FIG. 2) has an output shaft 82 which is connected to a drive pulley 84. The drive pulley 84 is connected with a driven pulley 88 by a drive belt 90. The driven pulley 88 is connected to the ball nut assembly 52. It is contemplated that the driven pulley 88 may be connected to the gear 50. Therefore, the driven pulley 88 rotates with the ball nut assembly 52 relative to the housing 60 and the steering member 72. The drive belt 90 transmits force to the ball nut assembly 52 to rotate the ball nut assembly about the axis 64 during operation of the motor and rotation of the drive pulley 84. It is contemplated that the motor 80 may apply a rotational force to the ball nut assembly 52 in any desired manner.

It is contemplated that the gear box 20 may be connected to a cover 96 for the drive belt 90 and pulleys 84, 88. The cover 96 may be connected to a support member or plate 98. The electric motor 80 and housing 60 may be connected to the support member 98. The electric motor 80 may be connected to the support member 98 with the output shaft 82 extending generally parallel to the steering member 72. The support member 98 connects the gear box 20, the housing 60 and the motor 80 to the vehicle.

The apparatus 10 (FIG. 1) may include two vehicle condition sensors 100, 102 and an electronic control unit 104 (ECU) for controlling the motor 80 based on sensed vehicle conditions. The vehicle condition sensors 100, 102 may include a torque sensor 100 and a position sensor 102 electrically connected to the ECU 104. The torque sensor 100 may sense the torque applied to the steering wheel 16 and generate a signal indicative of the torque. The position sensor 102 may sense the rotational position of the steering wheel 16 and generate an electrical signal indicative of the steering wheel position. The electrical signals from the torque sensor 100 and the position sensor 102 are sent to the ECU 104.

The ECU 104 analyzes the output of the sensors 100, 102 and effects operation of the motor 80 as a function of the output of the sensors. Although the sensors 100 and 102 are shown as being connected to the gear box 20, it is contemplated that the sensors may be connected to the steering column 14. It is also contemplated, that only the torque sensor 100 or only the position sensor 102 may be used to effect operation of the motor 80.

In addition, the ECU 104 may have inputs which vary as a function of sensed lateral acceleration of the vehicle (not shown) or other vehicle operating conditions. The ECU 104 receives the signals generated by the sensors and actuates the motor 80 in order to apply an axial force to the steering member 72 to assist in turning of the steerable vehicle wheels.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels comprising:
    a steering member connected to at least one steerable vehicle wheel, the steering member moving axially to effect turning movement of the at least one steerable vehicle wheel, the steering member having an externally threaded portion;
    a ball nut assembly connected with the externally threaded portion of the steering member, the ball nut assembly being rotatable relative to the steering member to axially move the steering member;
    a first gear member rotatable in response to rotation of a steering wheel;
    a second gear member disposed in meshing engagement with the first gear member, the second gear member rotating in response to rotation of the first gear member, the ball nut assembly rotating relative to the steering member in response to rotation of the second gear member, the second gear member having a first gear in meshing engagement with the first gear member and a second gear in meshing engagement with a third gear member connected with the ball nut assembly, the third gear member being connected to the ball nut assembly and rotatable with the ball nut assembly relative to the steering member.

2. An apparatus for use in turning steerable vehicle wheels as set forth in claim 1 further including an electrical motor connected with the ball nut assembly, the motor being operable to apply a rotational force to the ball nut assembly to urge the ball nut assembly to rotate relative the steering member.

3. An apparatus for use in turning steerable vehicle wheels as set forth in claim 2 further including at least one vehicle condition sensor and a control unit connected with the at least one vehicle condition sensor, the at least one vehicle condition sensor providing an output to the control unit, the control unit being connected with the motor and being operable to control the operation of the motor as a function of the output from the at least one vehicle condition sensor.

4. An apparatus for use in turning steerable vehicle wheels as set forth in claim 2 further including at least one of a torque sensor for sensing a torque applied to the steering wheel and a position sensor for sensing the position of the steering wheel and a control unit connected with the at least one of the torque sensor and the position sensor, the at least one of the torque sensor and the position sensor providing an output to the control unit, the control unit being connected with the motor and being operable to control the operation of the motor as a function of the output from the at least one of the torque sensor and the position sensor.

5. An apparatus for use in turning steerable vehicle wheels as set forth in claim 2 wherein the first gear member and the first gear of the second gear member are bevel gears.

6. An apparatus for use in turning steerable vehicle wheels as set forth in claim 2 wherein the first gear member and the first gear of the second gear member increase the torque applied to the steering column.

7. An apparatus for use in turning steerable vehicle wheels as set forth in claim 2 wherein the first gear member is rotatable about a first axis and the second gear member is rotatable about a second axis extending transverse to the first axis.

8. An apparatus for use in turning steerable vehicle wheels as set forth in claim 1 wherein the first gear member and the first gear of the second gear member are bevel gears.

9. An apparatus for use in turning steerable vehicle wheels as set forth in claim 8 wherein the first gear member and the first gear of the second gear member increase the torque applied to the steering column.

10. An apparatus for use in turning steerable vehicle wheels as set forth in claim 1 wherein the first gear member is rotatable about a first axis and the second gear member is rotatable about a second axis extending transverse to the first axis.

11. An apparatus for use in turning steerable vehicle wheels as set forth in claim 10 wherein the second axis extends generally parallel to an axis of the steering member.

12. An apparatus for use in turning steerable vehicle wheels as set forth in claim 10 wherein a gear box supports said first and second gear members for rotation about the first and second axes.

13. An apparatus for use in turning steerable vehicle wheels as set forth in claim 12 wherein the gear box has an input shaft connected to the first gear member, the input shaft being connected to a steering wheel and rotatable relative to a housing of the gear box in response to rotation of the steering wheel.

14. An apparatus for use in turning steerable vehicle wheels as set forth in claim 12 wherein a support member connects the gear box, the electric motor and a housing supporting the ball nut assembly for rotation to the vehicle.

15. An apparatus for use in turning steerable vehicle wheels as set forth in claim 1 wherein the ball nut assembly extends within a tubular housing, the ball nut assembly being supported for rotation relative to the housing and prevented from moving axially relative to the housing.

\* \* \* \* \*